(12) United States Patent
Umeda et al.

(10) Patent No.: US 9,869,909 B2
(45) Date of Patent: Jan. 16, 2018

(54) LIQUID CRYSTAL DISPLAY APPARATUS

(71) Applicant: Mitsubishi Electric Corporation, Tokyo (JP)

(72) Inventors: Hiroshi Umeda, Tokyo (JP); Manabu Iwakawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/168,734

(22) Filed: May 31, 2016

(65) Prior Publication Data
US 2017/0003555 A1 Jan. 5, 2017

(30) Foreign Application Priority Data
Jul. 1, 2015 (JP) .................................. 2015-132414

(51) Int. Cl.
*G02F 1/1343* (2006.01)
*G02F 1/1337* (2006.01)

(52) U.S. Cl.
CPC .. *G02F 1/134363* (2013.01); *G02F 1/133707* (2013.01)

(58) Field of Classification Search
CPC ..................... G02F 1/134363; G02F 1/133707
See application file for complete search history.

(56) References Cited

U.S. PATENT DOCUMENTS

2007/0279567 A1* 12/2007 Matsushima ..... G02F 1/134363
349/143
2009/0251654 A1* 10/2009 Itou ................... G02F 1/134363
349/141

FOREIGN PATENT DOCUMENTS

JP        2009-237236 A     10/2009

* cited by examiner

*Primary Examiner* — James Dudek
(74) *Attorney, Agent, or Firm* — Studebaker & Brackett PC (57) ABSTRACT

Provided is a liquid crystal display apparatus capable of preventing a disclination and minimizing a decrease in contrast ratio caused by leakage of light. A counter electrode formed on an array substrate has a plurality of slits within one pixel. The slit which is relatively short has bent edge portions in which edges of the slit are bent. The slits which are relatively long do not have bent edges.

5 Claims, 9 Drawing Sheets

LIQUID CRYSTAL DISPLAY APPARATUS

BACKGROUND OF THE INVENTION

Field of the Invention

The present invention relates to a liquid crystal display apparatus.

Description of the Background Art

An example of known liquid crystal display apparatuses includes an in-plane-switching-mode (also referred to as a transverse electric field mode) liquid crystal display apparatus in which both of two electrodes for generating an electric field that is used to drive the liquid crystal are disposed on one of two substrates that hold a liquid crystal, to thus drive the liquid crystal in a lateral (approximately horizontal direction with respect to the substrate) electric field. The liquid crystal display in the transverse electric field mode, which has a view-angle characteristic superior to a view-angle characteristic of a liquid crystal display in a twisted nematic (TN) mode, has the liquid crystal that little contributes to display. Such a liquid crystal display thus has a smaller transmittance of light than the liquid crystal display in the TN mode.

An example of liquid crystal display apparatuses in the transverse electric field mode includes a liquid crystal display apparatus in a fringe field switching (FFS) mode. This liquid crystal display apparatus has improved the above drawback. The liquid crystal display apparatus in the FFS mode is configured such that one of two electrodes that generate a transverse electric field is a latticed or comb-like electrode having slits, and is configured such that a liquid crystal is driven by a lateral fringe electric field generated between these two electrodes (strictly speaking, the fringe electric field generated in the FFS mode has a mix of a lateral electric field and a nearly-lateral electric field, but a main constituent of the fringe electric field is the lateral electric field).

An external pressure may be applied to a liquid crystal panel in the liquid crystal display in the transverse electric field mode. Such an external pressure causes a disclination (liquid crystal alignment abnormal region) to expand in an extending direction of the slits of the latticed or comb-like electrode never to return. This can produce variations in display (called "weighted traces" or "ripples"). Japanese Patent Application Laid-Open No. 2009-237236 proposes an example of techniques for solving this problem, i.e., a method of bending edges of slits of a latticed electrode.

Contrast ratio has decreased in a liquid crystal display panel that includes a latticed electrode whose slits have bent edges, as described in Japanese Patent Application Laid-Open No. 2009-237236. An increase in leakage of light at the bent edges of the slits causes this problem. Specifically, the contrast ratio decreases due to a quick rise in transmittance in a low voltage on a V-T curve (characteristic curve of voltage-transmittance) in this area.

SUMMARY OF THE INVENTION

It is an object of the present invention to provide a liquid crystal display apparatus capable of preventing a disclination and minimizing a decrease in contrast ratio caused by leakage of light.

The liquid crystal display apparatus according to an aspect of the present invention includes a pixel electrode and a counter electrode each formed on one of two substrates that hold a liquid crystal. At least one of the pixel electrode and the counter electrode has a plurality of slits or a plurality of electrodes. Only a relatively short slit among the plurality of slits or only a relatively short electrode among the plurality of electrodes has a bent edge portion in which an edge of the relatively short slit or the relatively short electrode is bent.

According to the aspect of the present invention, the disclination is effectively prevented by providing against the disclination using the bent edge portion in the relatively short slit or relatively short electrode that is easy to produce the disclination. Moreover, a relatively long slit or a relatively long electrode that does not have the bent edge portion reduces the leakage of light to thus minimize the decrease in the contrast ratio.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
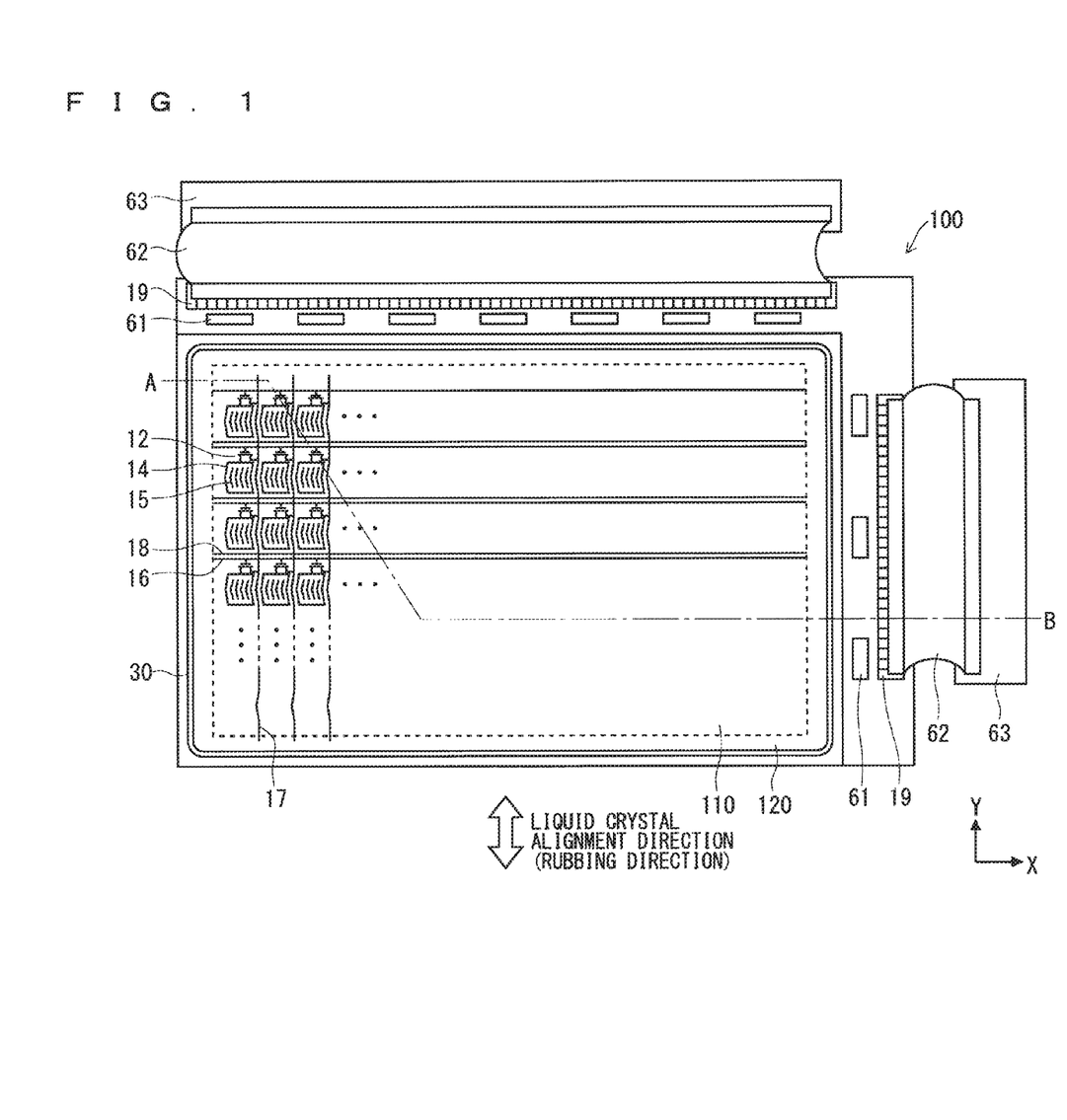
FIG. 1 is a plan view of a liquid crystal panel according to a first preferred embodiment.
Figure 2:
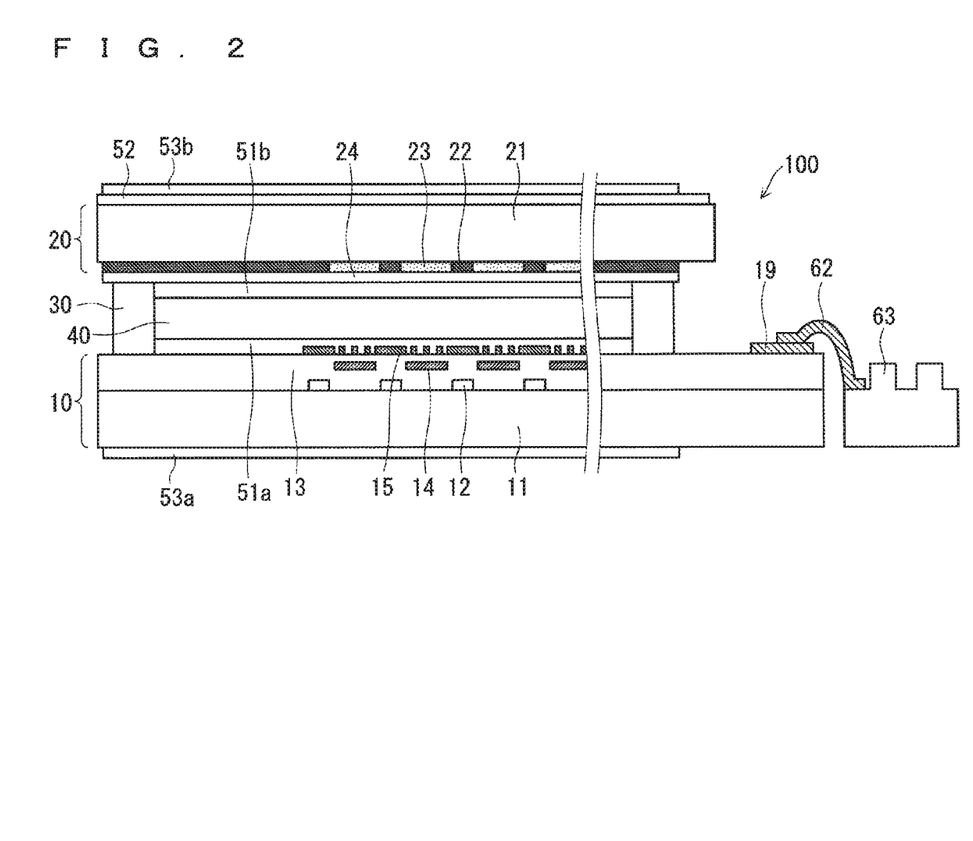
FIG. 2 is a cross-sectional view of the liquid crystal panel according to the first preferred embodiment.

FIGS. 1 and 2 are schematic diagrams of a liquid crystal panel forming a liquid crystal display apparatus according to a first preferred embodiment of the present invention. FIG. 1 is a plan view illustrating the liquid crystal panel in its entirety. FIG. 2 is a cross-sectional view taken along line A-B in FIG. 1. The present preferred embodiment illustrates an example in which the present invention is applied to a liquid crystal panel in a transverse electric field mode that uses thin film transistors (TFTs) as switching elements of individual pixels, and particularly applied to a liquid crystal panel in a FFS mode.

As illustrated in FIGS. 1 and 2, a liquid crystal panel 100 includes a TFT array substrate 10 (hereinafter referred to as an "array substrate 10"), a color filter substrate 20, and a liquid crystal layer 40 sealed between the array substrate 10 and the color filter substrate 20 with a sealant 30.

The sealant 30 surrounds a display region 110 where pixels of the liquid crystal panel 100 are disposed so that the entire display region 110 is filled with the liquid crystal layer 40. That is, the sealant 30 is disposed in a frame region 120 being a region outside the display region 110. In the present specification, the display region 110 and the frame region 120 are defined not only on the liquid crystal panel 100 after being assembled, but also on each of the array substrate 10, the color filter substrate 20, and the liquid crystal layer 40.

The array substrate 10 and the color filter substrate 20 have rectangular shapes in appearance. The array substrate 10 is larger than the color filter substrate 20. Hence, part of the frame region 120 of the array substrate 10 protrudes from an edge of the color filter substrate 20. Moreover, the display region 110 includes, between the array substrate 10 and the color filter substrate 20, many columnar spacers (not shown) that keep a certain distance between these substrates.

As illustrated in FIG. 1, the display region 110 of the array substrate 10 has an array (matrix) of pixels including TFTs 12 (switching elements), pixel electrodes 14 and counter electrodes 15 (common electrodes). The display region 110 of the array substrate 10 further has a plurality of gate wires 16 each connected to a gate electrode of the corresponding TFT 12 and a plurality of source wires 17 each connected to a source electrode of the corresponding TFT 12. Each of the plurality of gate wires 16 extends in a row direction (x direction) of the pixels. Each of the plurality of source wires 17 extends in a column direction (y direction) of the pixels. The plurality of gate wires 16 and the plurality of source wires 17 cross each other. The pixels are formed in individual regions (pixel regions) defined by two of the gate wires 16 and two of the source wires 17.

Each pixel is configured such that a pixel electrode 14 is connected to a drain electrode of the TFT 12, and that a counter electrode 15 is disposed above and opposite the pixel electrode 14. That is, in the present preferred embodiment, an upper electrode in the FFS mode is the counter electrode 15, and a lower electrode in the FFS mode is the pixel electrode 14. The pixel electrode 14 is a plate-like transparent electrode. The counter electrode 15 is a latticed transparent electrode having slits (slender openings). The pixel electrode 14 is supplied with a voltage corresponding to an image signal through the TFT 12. The counter electrode 15 is supplied with a constant voltage (common voltage) through a common wire 18. As a result, a lateral (direction parallel to the array substrate 100) fringe electric field according to the image signal is generated between the pixel electrode 14 and counter electrode 15 of each pixel. The liquid crystal layer 40 is driven by the lateral fringe electric field. It is noted that the common wires 18 extend in parallel to the gate wires 16 and are provided as many as the gate wires 16 in the present preferred embodiment.

In the first preferred embodiment, each of the pixel electrodes 14 is bent at the vertical center of the pixel region. Moreover, each of the source wires 17 is zigzag bent along bent sides of the pixel electrodes 14. Hence, the pixel region, defined by the two of the gate wires 16 and the two of the source wires 17, is not rectangular, but is bent at the vertical center of the pixel region.

Further, as illustrated in FIG. 2, the TFTs 12, the pixel electrodes 14, and the counter electrodes 15 are formed on a glass substrate 11 (transparent substrate) with transparent insulating films 13 interposed between the TFTs 12 and the pixel electrodes 14, and between the pixel electrodes 14 and the counter electrodes 15. Hence, connections between the drain electrodes of the TFTs 12 and the pixel electrodes 14, and connections between the common wires 18 and the counter electrodes 15 are established through contact holes (not shown) formed in the insulating films 13. For simplification, FIG. 2 illustrates the insulating film 13 between the TFTs 12 and the pixel electrodes 14, and the insulating film 13 between the pixel electrodes 14 and the counter electrodes 15 as if these films are a single film. However, both insulating films 13 are actually formed in separate steps.

Here, the counter electrode 15 having the slits is disposed above the plate-like pixel electrode 14. However, the shapes of the pixel electrode 14 and the counter electrode 15 are not limited to this configuration. Neither is the positional relationship between these electrodes. For instance, pixel electrode 14 having slits may be disposed above a plate-like pixel electrodes 15. That is, the pixel electrode 14 may be the upper electrode; the counter electrode 15, the lower electrode.

Meanwhile, the color filter substrate 20 includes a black matrix 22 formed on a glass substrate 21 (transparent substrate), color filters 23 formed within openings of the black matrix 22, and an overcoat layer 24 covering the black matrix 22 and the color filters 23.

The black matrix 22 is a light-shielding film in which a region of each pixel is open, and the black matrix 22 shields a region between the individual pixels (between the individual color filters 23) or the frame region 120. A metal derivative material mainly made of chromium oxide or a resin derivative material with black particles dispersed within resin can be selected for a material of the black matrix 22. Each of the color filters 23 is a coloring material layer with pigments dispersed within resin, and serves as a filter that selectively transmits light within a specific wavelength range, such as red, green, or blue. The display region 110 of the color filter substrate 20 has coloring material layers of individual colors arranged regularly. The overcoat layer 24 is a transparent resin film for making the surfaces of the color filter 23 and black matrix 22 even.

Alignment films 51a and 51b that align a liquid crystal are respectively disposed on surfaces of the array substrate 10 and the color filter substrate 20, where these surfaces are close to the liquid crystal layer 40. The alignment films 51a and 51b have a liquid crystal alignment direction along an extending direction of the slits of the counter electrode 15. The liquid crystal alignment direction agrees with a rubbing direction of the alignment films 51a and 51b. As described later on, in the present preferred embodiment, the slits of the counter electrode 15 extend in a column direction (y direction) of the pixels. Hence, the liquid crystal alignment direction is also the y direction.

Further, an antistatic film 52 including a transparent conductive film is disposed on a front surface (display surface) of the color filter substrate 20. The antistatic film 52 covers at least the display region 110 and prevents, when grounded, poor display caused by charging because of static electricity or by an external electric field. Moreover, polarizing plates 53a and 53b are respectively disposed on a back surface of the array substrate 10 and above the front surface of the color filter substrate 20 (on the antistatic film 52) to cover at least the display region 110.

It is to be noted that an example of how to connect the antistatic film 52 on the color filter substrate 20 and a ground potential together includes placing a pad (ground pad) supplied with the ground potential in a part of the array substrate 10 protruding from an edge of the color filter substrate 20 (hereinafter referred to as a "protrusion") to thus connect the antistatic film 52 and the ground pad together using a conductive tape. In this case, a region of the antistatic film 52 not covered with the polarizing plate 53a needs to be reserved to be a region to which the conductive tape is attached.

Further, the protrusion of the array substrate 10 is equipped with driving integrated circuits (IC) 61 that output signals to the gate wires 16 and the source wires 17. Moreover, the edge of the protrusion has signal terminals 19 for inputting control signals to the driving IC chips 61. The signal terminals 19 are connected, via a flexible flat cable (FFC) being a connection wire, to a control substrate 63 equipped with components including control IC chips that generate the control signals.

The liquid crystal display apparatus according to the first preferred embodiment is produced by placing components such as a backlight unit that is a light source and an optical sheet that adjusts light entering the liquid crystal panel 100 from the backlight unit, and by accommodating these components within a housing having an opening that matches the display region 110.

Here, the following summarizes operation of the liquid crystal display apparatus according to the first preferred embodiment. Once the driving IC chips 61 operate in accordance with the control signals from the control substrate 63, driving signals of TFTs 12 are supplied to the gate wires 16, and image signals are supplied to the source wires 17. A voltage according to the image signal is applied across the pixel electrode 14 of each pixel, to thus generate a fringe electric field according to the image signal between the pixel electrode 14 and the counter electrode 15. This changes a direction of a liquid crystal molecule of each pixel, to thus regulate the amount of transmitting light from backlight for each pixel. An image is displayed in the display region 110 depending on a resulting difference in brightness of each pixel.

Figure 3:
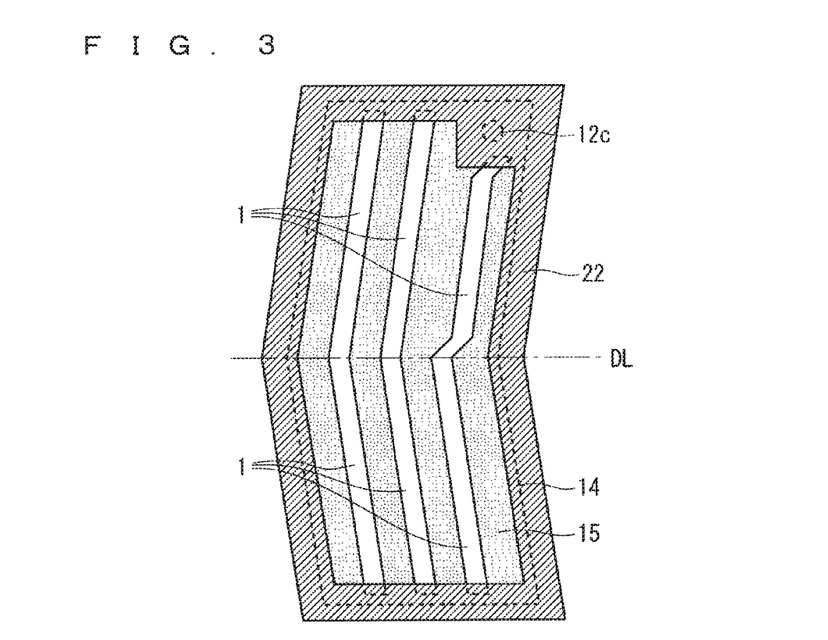
FIGS. 3 and 4 are diagrams illustrating configurations of a pixel of the liquid crystal panel according to the first preferred embodiment.
Figure 4:
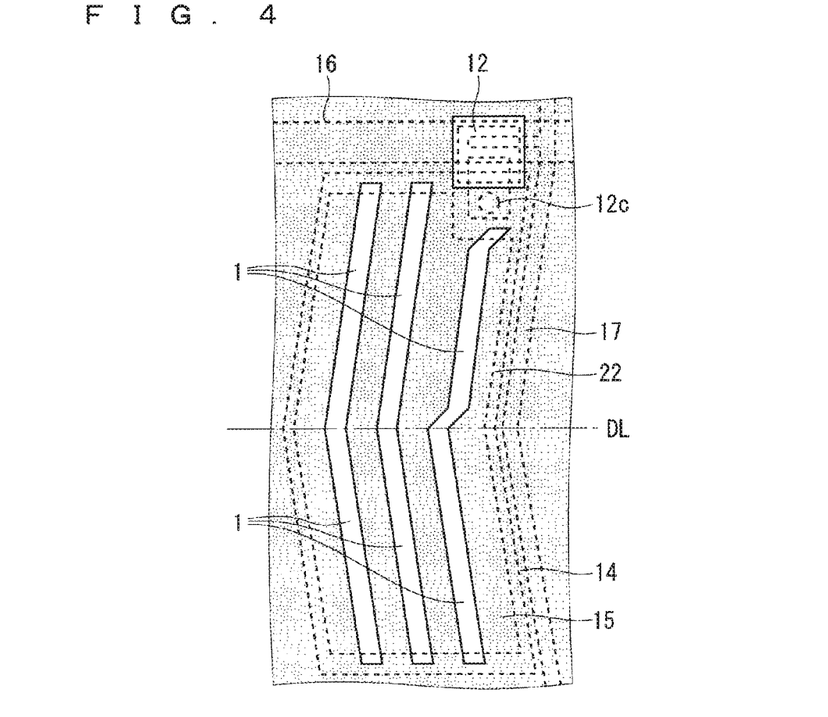

Next, the following describes a configuration of the pixel, which is a feature of the liquid crystal display apparatus according to the first preferred embodiment. FIGS. 3 and 4 are diagrams illustrating configurations of the pixel of the liquid crystal panel according to the first preferred embodiment. FIG. 3 is a plan view of one pixel with the array substrate 10 and the color filter substrate 20 overlapped each other, and FIG. 3 mainly illustrates the black matrix 22 of the color filter substrate 20 and the pixel electrode 14 and counter electrode 15 of the array substrate 10. FIG. 4 is a plan view of one pixel with only the array substrate 10, and FIG. 4 mainly illustrates the pixel electrode 14, counter electrode 15, TFT 12, gate wire 16 and source wire 17 of the array substrate 10 as well as a position of an opening of the pixel electrode 14 of the array substrate 10.

As illustrated in FIG. 3, the black matrix 22 is disposed on the pixel electrode 14 and the counter electrode 15 with the array substrate 10 and the color filter substrate 20 overlapped each other, and an opening of the black matrix 22 is the pixel region. Moreover, the counter electrode 15 has a plurality of slits 1 in parallel within the pixel region. Furthermore, the counter electrode 15 has an opening in an overlap with the TFT 12 as well, as illustrated in FIG. 4.

In the present preferred embodiment, some of the slits 1 arranged in the upper half part of the pixel region have an extending direction (tilt angle) different from an extending direction of the other slits 1 arranged in the lower half part of the pixel region. In this way, each pixel is divided into two regions having different tilt angles of the slits 1 of the counter electrode 15, to thus be a multi-domain pixel. This reduces view-angle dependency of color in a liquid crystal display panel for color display. A boundary (domain boundary DL) of the two regions of the multi-domain pixel is a vertical center of the pixel region (a part close to the TFT 12 when view from the domain boundary DL is defined as being "above"; an opposite part, "below"). Moreover, as illustrated in FIG. 4, the pixel electrode 14 and the source wire 17 are bent at the domain boundary DL in agreement with the extending directions of the slits of the counter electrode 15.

In FIGS. 3 and 4, two of the slits 1 arranged with the domain boundary DL interposed between the two slits 1 are apparently coupled together and apparently constitute a single bent slit. However, the present specification describes the two slits 1 independently of each other because the slits above and below the domain boundary DL behave differently from each other. The slits 1 above the domain boundary DL and the slits 1 below the domain boundary DL may be separated from each other.

Undergoing multi-domain causes colors of the two regions to be mutually cancelled. Hence, the slits 1 are basically arranged axisymmetrically with respect to the domain boundary DL serving as an axis. The slits 1, however, are not formed in, for example, a region above the TFT 12, or a region above a contact hole 12C (TFT contact hole) for connecting the pixel electrode 14 to the TFT 12 because an effective display operation is difficult. Hence, a certain slit 1 disposed near such a region is formed to be shorter than the others.

Figure 5:
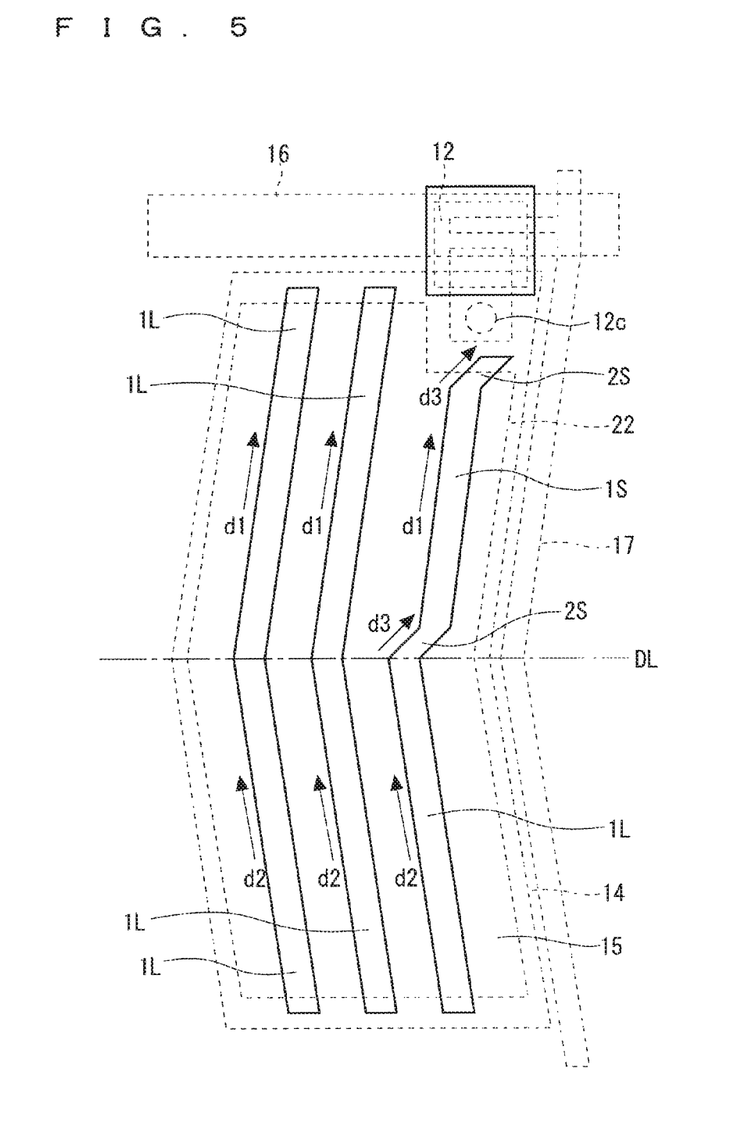
FIG. 5 is a diagram illustrating a configuration of slits of a counter electrode of the liquid crystal panel according to the first preferred embodiment.

FIG. 5 is a plan view illustrating a configuration of the plurality of slits 1 disposed in the counter electrode 15. As illustrated in FIG. 5, relatively long slits 1 (long slits 1L) are formed on the almost entire surface of the counter electrode 15, and a relatively short slit 1 (short slit 1S) is formed in a position near the TFT 12. In the first preferred embodiment, the short slit 1S has bent edge portions 2S in which the edges of the short slit 1S are bent. The bent edge portions 2S are disposed at both ends (two locations) of the short slit 1S. The long slits 1L are each linear without bent edge portions.

With reference to FIG. 5, the following describes extending directions of the long slits 1L and extending directions of the short slit 1S and its bent edge portions 2S. The extending direction of the long slits 1L above the domain boundary DL and the extending direction of the short slit 1S also above the domain boundary DL (excluding the bent edge portions 2S) are the same, a direction d1. The extending direction of the long slits 1L below the domain boundary DL is a direction d2 different from the direction d1. The direction d1 and the direction d2 are set so that angles (acute angles) of these directions with respect to the domain boundary DL are equal to each other. Here, the angles of the direction d1 and direction d2 with respect to the domain boundary DL are set to be about 80 degrees (preferably 75 degrees or more and less than 90 degrees).

An extending direction d3 of the bent edge portions 2S of the short slit 1S is set so that an angle of the direction d3 with respect to the domain boundary DL is smaller than the angle of the direction d1 with respect to the domain boundary DL.

It is noted that an extending direction of the slit 1 agrees with extending directions of both sides of the slit 1 when the slit 1 (including the long slits 1L, the short slit 1S and the bent edge portions 2S) has a uniform width. However, the extending direction of either side of the slit 1 needs to be defined as the extending direction of the slit 1 when the slit 1 has a non-uniform width.

A disclination (liquid crystal alignment abnormal region) that is produced when an external pressure is applied to a liquid crystal panel is easy to expand in edge portions of the short slit 1S and is a cause of weighted traces or ripples. Accordingly, the bent edge portions 2S are disposed in the short slit 1S to prevent the disclination. The long slits 1L seldom produce the weighted traces or ripples when the long slits 1L have sufficient lengths, for instance, when the extending direction of the slits 1 is a longer-side direction of the pixel region (or a shorter-side direction of the pixel electrode 14) as described in the present preferred embodiment. Hence, the long slits 1L do not have bent edge portions. This reduces leakage of light at the edge portions of the long slits 1L, to thus minimize a decrease in contrast ratio.

As described above, the first preferred embodiment provides against the disclination intensively for the short slit 1S that is easy to produce the disclination. This prevents variations in display caused by the weighted traces or ripples while minimizing the decrease in the contrast ratio that is a disadvantage of these countermeasures.

Modification

Figure 6:
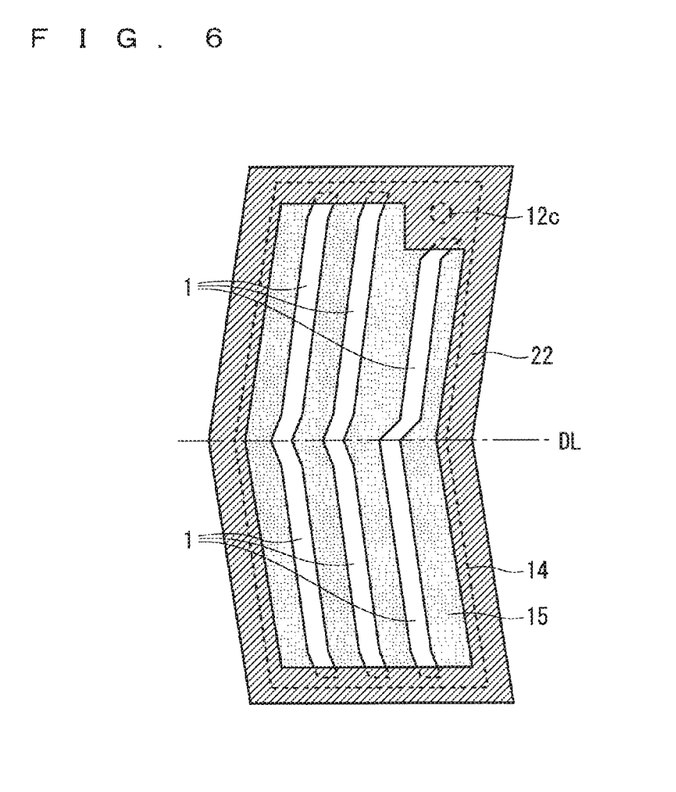
FIG. 6 is a diagram illustrating a modification of the pixel of the liquid crystal panel according to the first preferred embodiment.
Figure 7:
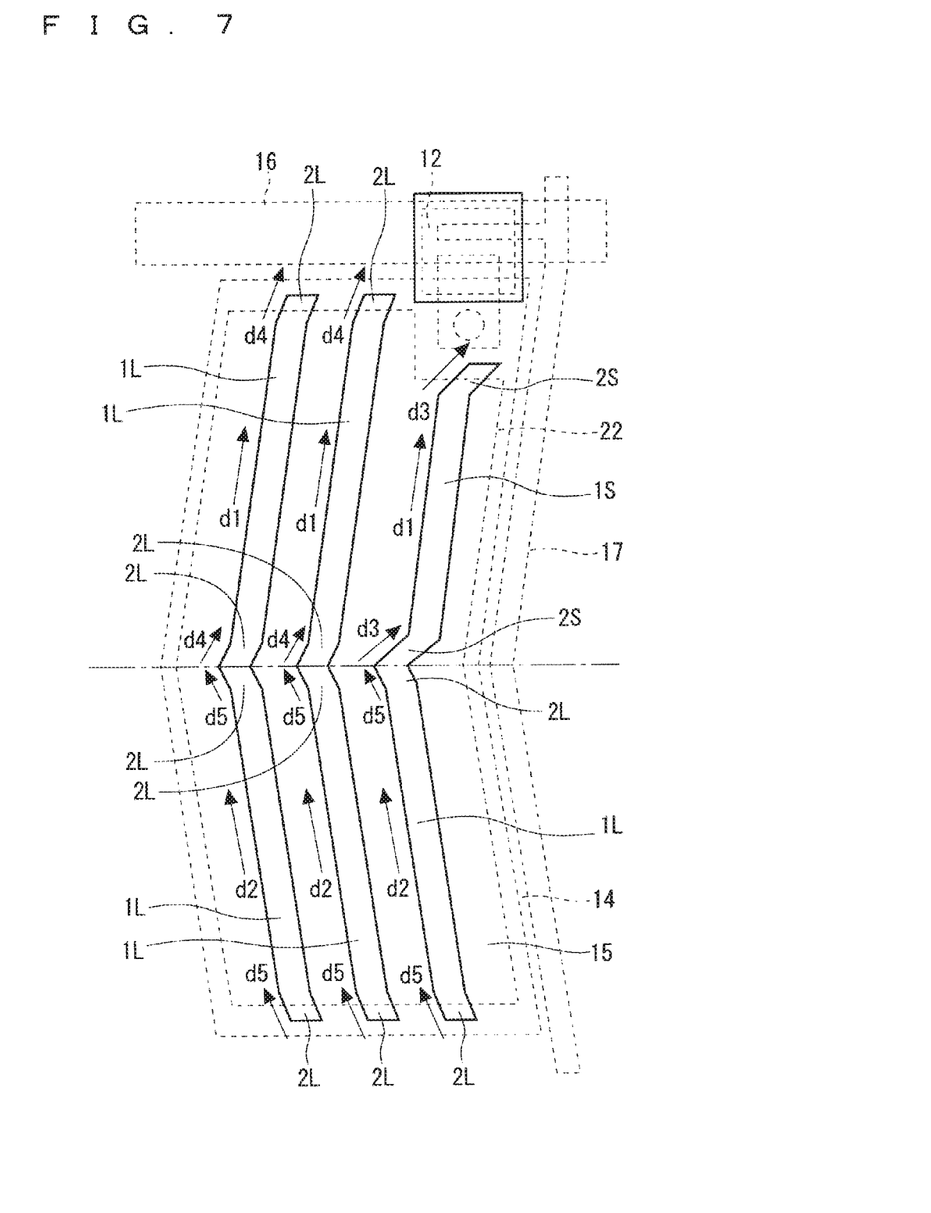
FIG. 7 is a diagram illustrating a modification of the configuration of the slits of the counter electrode of the liquid crystal panel according to the first preferred embodiment.

FIGS. 6 and 7 are diagrams illustrating modifications of the pixel of the liquid crystal panel according to the first preferred embodiment. FIG. 6 is a plan view of one pixel with the array substrate 10 and the color filter substrate 20 overlapped each other. FIG. 7 is a plan view illustrating a configuration of the plurality of slits 1 (long slits 1L and short slit 1S) disposed in the counter electrode 15.

The long slits 1L may also produce the disclination depending on the lengths of the long slits 1 or other conditions. In such a case, it is preferable that not only the short slit 1S have the bent edge portions 2S, but also each of the long slits 1L have bent edge portions 2L. In addition, the bent edge portions 2L disposed in the long slit 1L should have bend angles (degrees of bend) smaller than bend angles of the bent edge portions 2S of the short slit S1 in order to minimize the decrease in the contrast ratio. The bent edge portions 2S are disposed at both ends (two locations) of the short slit 1S. The bent edge portions 2L are disposed at both ends (two locations) of the long slit 1L.

With reference to FIG. 7, the following describes extending directions of the long slits 1L and their bent edge portions 2L, and describes extending directions of the short slit 1S and its bent edge portions 2S. Like the first preferred embodiment, both the extending direction of the long slits 1L above the domain boundary DL and the extending direction of the short slit 1S above the domain boundary DL are the direction d1. The extending direction of the long slits 1L below the domain boundary DL is the direction d2 different from the direction d1. The direction d1 and the direction d2 are set so that angles (acute angles) of these directions with respect to the domain boundary DL are equal to each other. Here, the angles of the direction d1 and direction d2 with respect to the domain boundary DL are set to be about 80 degrees (preferably 75 degrees or more and less than 90 degrees).

The extending direction d3 of the bent edge portions 2S disposed in the short slit 1S are set such that the angle of the direction d3 with respect to the domain boundary DL is smaller than the angle of the direction d1 with respect to the domain boundary DL. An extending direction d4 of the bent edge portions 2L disposed in the long slits 1L above the domain boundary DL are also set so that an angle of the direction d4 with respect to the domain boundary DL is smaller than the angle of the direction d1 with respect to the domain boundary DL. In addition, an angle of the direction d4 with respect to the direction d1 is set to be smaller than an angle of the direction d3 with respect to the direction d1. That is, the bend angles (degrees of bend) of the bent edge portions 2L from the long slits 1L are smaller than the bend angles of the bent edge portions 2S from the short slit 1S.

Further, an extending direction d5 of the bent edge portions 2L disposed in the long slits 1L below the domain boundary DL is set so that an angle of the direction d5 with respect to the domain boundary DL is smaller than the angle of the direction d2 with respect to the domain boundary DL. In addition, an angle of the direction d5 with respect to the direction d2 is set to be smaller than the angle of the direction d3 with respect to the direction d1. That is, the long slits 1L below the domain boundary DL is also configured such that the bend angles (degrees of bend) of the bent edge portions 2L from the long slits 1L are smaller than the bend angles of the bent edge portions 2S from the short slit 1S.

A large bend angle of the bent edge portion disposed in each of the slits 1 more effectively prevents the disclination, but increases the degree of the leakage of light. Conversely, a small bend angle of the bent edge portion less effectively prevents the disclination, but decreases the degree of the leakage of light. That is, the prevention of the disclination and the minimization of the leakage of light are trade-off.

The long slits 1L are less likely to produce the disclination than the short slit 1S. Thus, the long slits 1L each having a small bend angle sufficiently prevent the disclination. Moreover, small bend angles of the bent edge portions 2L of the long slit 1L minimize the leakage of light as well.

That is, in the present modification, the individual slits 1 (long slits 1L and short slit 1S) have the bent edge portions with appropriate bend angles according to degrees at which the disclination is easy to be produced. This minimizes the decrease in the contrast ratio caused by the leakage of light while reducing the weighted traces or ripples.

Second Preferred Embodiment

Figure 8:
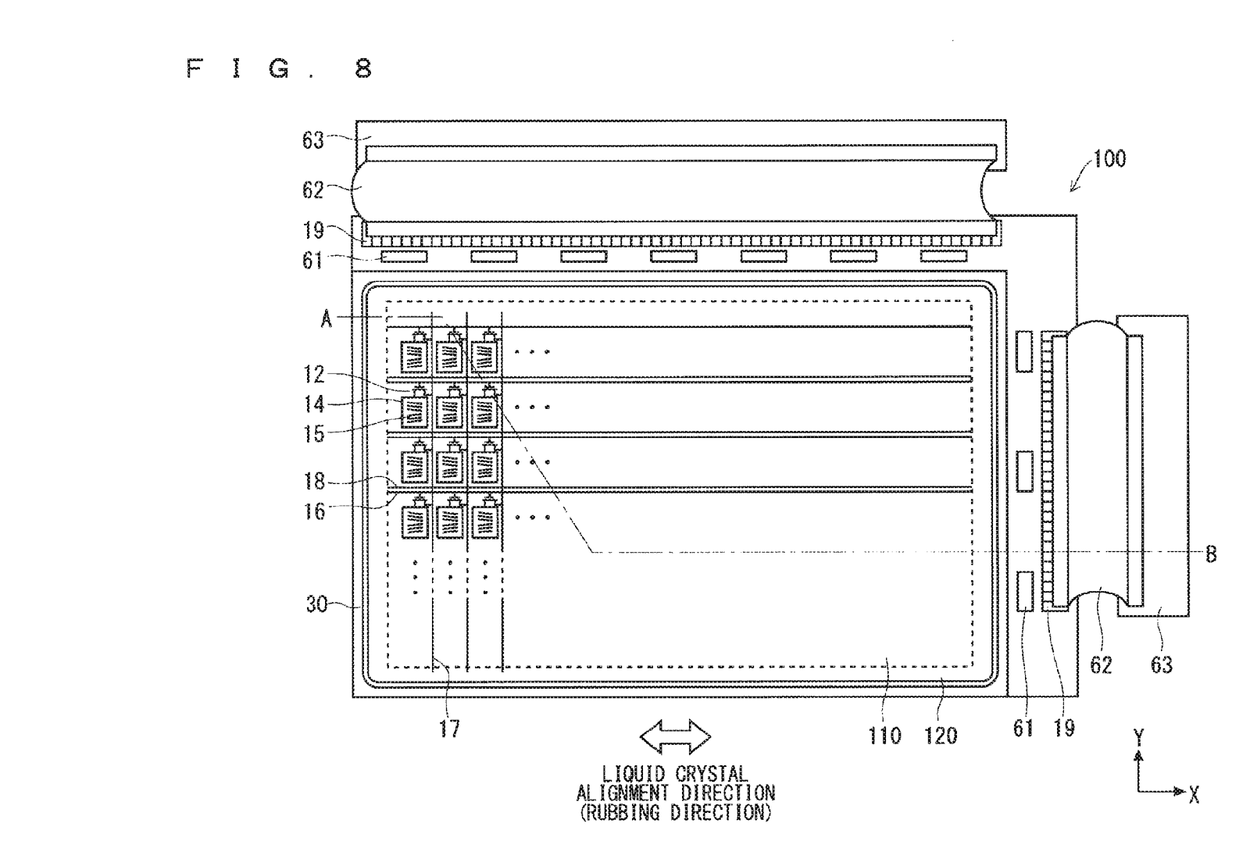
FIG. 8 is a plan view of a liquid crystal panel according to a second preferred embodiment.

FIG. 8 is a schematic diagram of a liquid crystal panel forming a liquid crystal display apparatus according to a second preferred embodiment. The liquid crystal display apparatus according to the second preferred embodiment is basically configured similarly to the liquid crystal display apparatus according to the first preferred embodiment except that an extending direction of slits 1 disposed in an individual counter electrode 15 is a row direction (x direction) of pixels. As previously described, the liquid crystal alignment direction (rubbing direction) of the alignment films 51a and 52b (FIG. 2) is along the extending direction of the slits 1 of the counter electrode 15. Hence, the x direction is the liquid crystal alignment direction.

Figure 9:
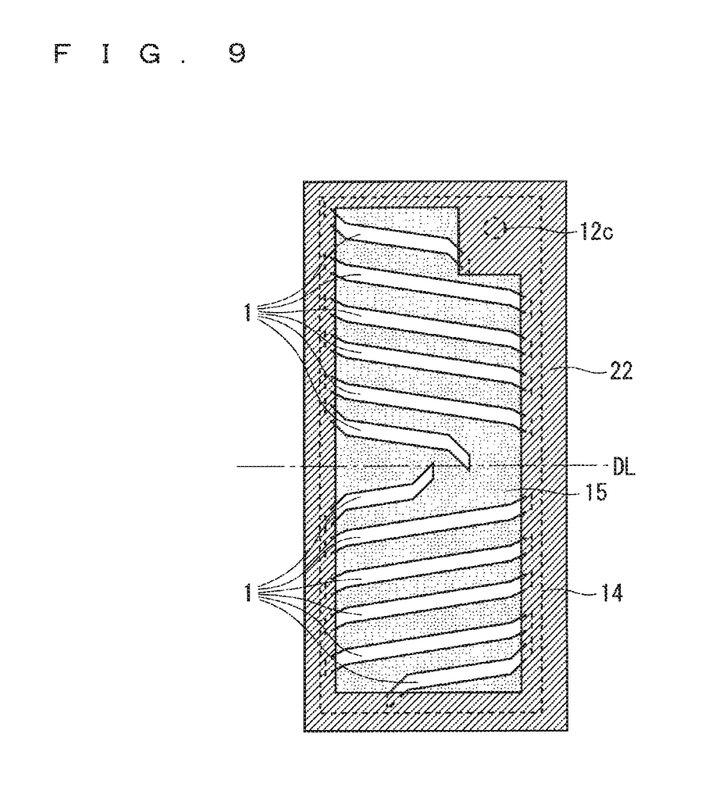
FIG. 9 is a diagram illustrating a configuration of a pixel of the liquid crystal panel according to the second preferred embodiment.
Figure 10:
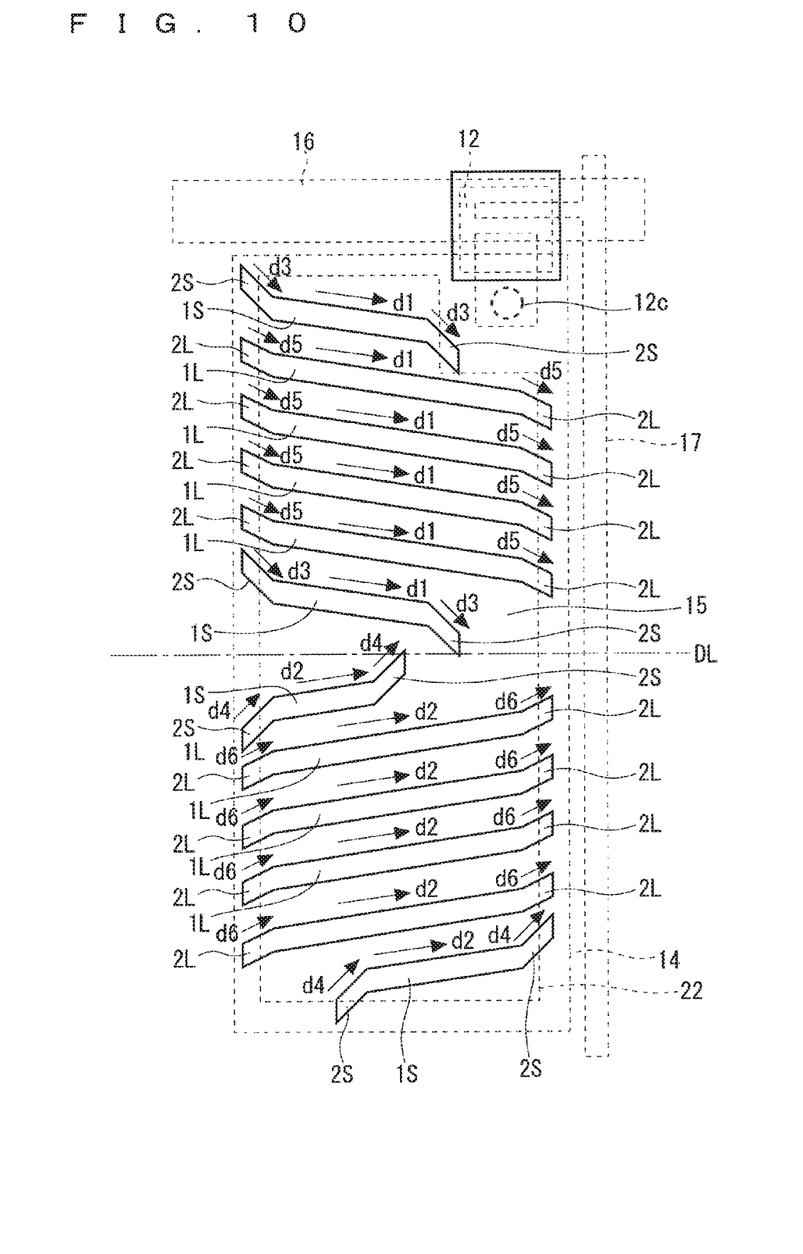
FIG. 10 is a diagram illustrating a configuration of slits of a counter electrode of the liquid crystal panel according to the second preferred embodiment.

FIGS. 9 and 10 are diagrams illustrating configurations of the pixel of the liquid crystal panel according to the second preferred embodiment. FIG. 9 is a plan view of one pixel with an array substrate 10 and a color filter substrate 20 overlapped each other. FIG. 10 is a plan view illustrating a configuration of the plurality of slits 1 (long slits 1L and short slits 1S) disposed in the counter electrode 15.

As illustrated in FIG. 9, the counter electrode 15 according to the second preferred embodiment is configured such that the plurality of slits 1 extend in a shorter-side direction of a pixel region being an opening of a black matrix 22 (or in a shorter-side direction of an individual pixel electrode 14). In this case, the slits are short in their entirety compared to the slits 1 extending in the longer-side direction of the pixel region as described in the first preferred embodiment.

As illustrated in FIG. 10, relatively long slits 1 (long slits 1L) are formed on the almost entire surface of the counter electrode 15. Moreover, relatively short slits 1 (short slits 1S) are respectively formed at top and bottom ends in a region above a domain boundary DL and at top and bottom ends in a region below the domain boundary DL (i.e., four short slits 1S are disposed in one pixel). Moreover, each of the short slits 1S has bent edge portions 2S at both ends (two locations) of the short slit 1S. Furthermore, each of the long slits 1L has bent edge portions 2L at both ends (two locations) of the long slit 1L.

With reference to FIG. 10, the following describes extending directions of the long slits 1L and their bent edge portions 2L, and describes extending directions of the short slits 1S and their bent edge portions 2S. The extending direction of the long slits 1L (excluding the bent edge portions 2L) above the domain boundary DL and the extending direction of the short slits 1S (excluding the bent edge portions 2S) also above the domain boundary DL are the same, a direction d1. The extending directions of the long slits 1L and short slits 1S below the domain boundary DL are a direction d2 different from the direction d1. The direction d1 and the direction d2 are set so that the angles (acute angles) of these directions with respect to the domain boundary DL are equal to each other. Here, the angles of the direction d1 and direction d2 with respect to the domain boundary DL are set to be about 10 degrees (preferably more than 0 degrees and 15 degrees or less).

An extending direction d3 of the bent edge portions 2S disposed in the short slits 1S above the domain boundary DL is set so that an angle of the direction d3 with respect to the domain boundary DL is larger than the angle of the direction d1 with respect to the domain boundary DL. Moreover, an extending direction d5 of the bent edge portions 2L disposed in the long slits 1L above the domain boundary DL is also set so that an angle of the direction d5 with respect to the domain boundary DL is larger than the angle of the direction d1 with respect to the domain boundary DL. In addition, an angle of the direction d5 with respect to the direction d1 is set to be smaller than an angle of the direction d3 with respect to the direction d1. That is, bend angles (degrees of bend) of the bent edge portions 2L from the long slits 1L are smaller than bend angles of the bent edge portions 2S from the short slits 1S.

Meanwhile, an extending direction d4 of the bent edge portions 2S disposed in the short slits 1S below the domain boundary DL is set so that an angle of the direction d4 with respect to the domain boundary DL is larger than the angle of the direction d2 with respect to the domain boundary DL. Moreover, an extending direction d6 of the bent edge portions 2L disposed in the long slits 1L below the domain boundary DL is also set so that an angle of the direction d6 with respect to the domain boundary DL is larger than the angle of the direction d2 with respect to the domain boundary DL. In addition, an angle of the direction d6 with respect to the direction d2 is set to be smaller than an angle of the direction d4 with respect to the direction d2. That is, bend angles (degrees of bend) of the bent edge portions 2L from the long slits 1L are smaller than bend angles of the bent edge portions 2S from the short slits 1S.

The long slits 1L are less likely to produce a disclination than the short slits 1S. Thus, the long slits 1L each having a small bend angle sufficiently prevent the disclination. Moreover, small bend angles of the bent edge portions 2L in the long slit 1L minimize the leakage of light as well.

That is, in the second preferred embodiment, the individual slits 1 (long slits 1L and short slits 1S) have the bent edge portions with appropriate bend angles according to degrees at which the disclination is easy to be produced. This minimizes a decrease in contrast ratio caused by leakage of light while reducing weighted traces or ripples. This is effective particularly when the long slits 1L are relatively short, for instance, when the slits 1 extend in the shorter-side direction of the pixel region as described in the present preferred embodiment.

Further, in the second preferred embodiment, the bent edge portions 2S of the two short slits 1S above the domain boundary DL have the same extending direction, the direction d3, and the bent edge portions 2S of the two short slits 1S below the domain boundary DL have the same extending direction, the direction d4. However, different bent edge portions 2S of the short slits 1S may have different extending directions for each short slit 1S. For instance, it is preferable that a shorter slit 1S among the short slits 1S have larger bend angles of the bent edge portions 2S from the shorter slit 1S when there are noticeable differences in length among the multiple short slits 1S. In examples of FIGS. 9 and 10, it is preferable that the shortest short slit 1S immediately below the domain boundary DL have maximum bend angles of the bent edge portions 2S. In this way, bend angles of the bent edge portions disposed in the slits 1 are set according to the lengths (likelihood of the disclination) of the individual slits 1. This achieves more detailed settings of the degree of preventing the disclination and the degree of minimization of the leakage of light, and achieves optimization of these degrees.

Further, the above description illustrates an example in which the present invention is applied to the liquid crystal panel whose pixels are each configured such that the extending directions of the slits of the counter electrode are symmetrical within one pixel to thus form the multi-domain pixel. The present invention is also applicable to a liquid crystal panel whose pixels are each configured such that extending directions of slits are symmetrical in a multi-pixel unit (e.g., in a two-pixel unit) to thus form a multi-domain pixel, or to a liquid crystal panel not having multi-domain pixels but having single-domain pixels (liquid crystal panel in which extending directions of slits of counter electrodes are the same within individual pixels or among whole pixels).

Furthermore, the present invention may be applied to an in-plane-switching mode that is a transverse electric field mode. In such a case, bent edge portions are not disposed in slits of a latticed electrode, but the bent edge portions instead are disposed at individual edges of the plurality of electrodes that constitute a comb-like electrode (electrode having a plurality of branch electrodes). A liquid crystal panel in the in-plane-switching mode, which is the transverse electric field mode, is configured such that both pixel electrode and counter electrode (common electrode) are comb-like electrodes. Such a liquid crystal panel is configured such that bent edge portions are disposed only in a relatively short electrode among a plurality of electrodes that constitute the comb-like electrode, or bent edge portions having large bend angles (degrees of bend) are disposed in the relatively short electrode and at the same time bent edge portions having small bend angles are disposed in a relatively long electrode. This configuration achieves an influence and effect similar to influences and effects in the first and second preferred embodiments.

It is to be noted that in the present invention, respective preferred embodiments can be freely combined, or can be modified and omitted as appropriate, within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display apparatus comprising a pixel electrode and a counter electrode each formed on one of two substrates that hold a liquid crystal,
   wherein at least one of said pixel electrode and said counter electrode has a plurality of slits or a plurality of electrodes, and
   wherein only a relatively short slit among said plurality of slits or only a relatively short electrode among said plurality of electrodes has a bent edge portion at each end thereof in which an edge of said relatively short slit or said relatively short electrode is bent.

2. The liquid crystal display apparatus according to claim 1,
   wherein said bent edge portion has a correspondingly large bend angle when said slit or said electrode, which has said bent edge portion, short.

3. A liquid crystal display apparatus comprising a pixel electrode and a counter electrode each formed on one of two substrates that hold a liquid crystal,
   wherein at least one of said pixel electrode and said counter electrode has a plurality of slits or a plurality of electrodes,
   wherein each of said plurality of slits or each of said plurality of electrodes has a bent edge portion in which an edge of each of said plurality of slits or each of said plurality of electrodes is bent, and
   wherein said bent edge portion disposed in a relatively long slit among said plurality of slits or a relatively long electrode among said plurality of electrodes has a bend angle smaller than a bend angle of said bent edge portion disposed in a relatively short slit among said plurality of slits or a relatively short electrode among said plurality of electrodes.

4. The liquid crystal display apparatus according to claim 3,
   wherein said bent edge portion has a correspondingly large bend angle when said slit or said electrode, which has said bent edge portion, is short.

5. A liquid crystal display apparatus comprising a pixel electrode and a counter electrode each formed on one of two substrates that hold a liquid crystal,
   wherein at least one of said pixel electrode and said counter electrode has a plurality of slits or a plurality of electrodes, and
   wherein only one relatively short slit among said plurality of slits or only one relatively short electrode among said plurality of electrodes has a bent edge portion in which an edge of said relatively short slit or said relatively short electrode is bent.

* * * * *